United States Patent
Togo et al.

(10) Patent No.: US 9,302,582 B2
(45) Date of Patent: Apr. 5, 2016

(54) DISPLAY SYSTEM FOR WORK VEHICLE HAVING POWER TAKE OFF (PTO)

(71) Applicant: Kubota Corporation, Osaka (JP)

(72) Inventors: Manabu Togo, Sakai (JP); Keita Ono, Sakai (JP); Ryuji Kitagawa, Sakai (JP); Koji Masumoto, Sakai (JP); Kengo Satoh, Sakai (JP)

(73) Assignee: Kubota Corporation, Osaka (JP)

( * ) Notice: Subject to any disclaimer, the term of this patent is extended or adjusted under 35 U.S.C. 154(b) by 2 days.

(21) Appl. No.: 13/775,606

(22) Filed: Feb. 25, 2013

(65) Prior Publication Data
US 2014/0067198 A1 Mar. 6, 2014

(30) Foreign Application Priority Data
May 11, 2012 (JP) ................................ 2012-109801

(51) Int. Cl.
*G01M 17/00* (2006.01)
*B60K 25/06* (2006.01)
*B60K 35/00* (2006.01)
*B60K 37/02* (2006.01)

(52) U.S. Cl.
CPC ............... *B60K 25/06* (2013.01); *B60K 35/00* (2013.01); *B60K 37/02* (2013.01); *B60K 2350/908* (2013.01)

(58) Field of Classification Search
CPC .............................................. B60K 2350/1072
USPC ....................................................... 701/33.7
See application file for complete search history.

(56) References Cited

U.S. PATENT DOCUMENTS

| | | | |
|---|---|---|---|
| 4,086,532 A * | 4/1978 | Aronson et al. | 324/166 |
| 4,551,801 A * | 11/1985 | Sokol | 701/29.6 |
| 4,747,301 A | 5/1988 | Bellanger | |
| 2004/0143511 A1* | 7/2004 | Miller et al. | 705/26 |
| 2006/0128524 A1* | 6/2006 | Busch | 477/110 |
| 2006/0191404 A1 | 8/2006 | Riedhammer | |
| 2010/0191404 A1 | 7/2010 | Ishikawa et al. | |

FOREIGN PATENT DOCUMENTS

| | | |
|---|---|---|
| JP | S633702 A | 1/1988 |
| JP | 6153610 A | 6/1994 |
| JP | 7-84144 B2 | 9/1995 |
| JP | 2004-114909 A | 4/2004 |
| JP | 2004-276791 A | 10/2004 |
| JP | 200670983 A | 3/2006 |

* cited by examiner

*Primary Examiner* — James Trammell
(74) *Attorney, Agent, or Firm* — The Webb Law Firm (57) ABSTRACT

A display system for a work vehicle includes a rotation speed display section for selectively displaying an engine rotation speed or a PTO rotation speed in a same display area, a display selection switch for outputting a display selection command, a discrimination display section for displaying a discrimination object for discriminating which of the engine rotation speed and the PTO rotation speed is being displayed and a display control section for selectively providing an engine rotation speed display signal or a PTO rotation speed display signal to the rotation speed display section based on the display selection command and providing the discrimination display section with a display signal for the discrimination object based on the display selection command.

10 Claims, 7 Drawing Sheets

DISPLAY SYSTEM FOR WORK VEHICLE
HAVING POWER TAKE OFF (PTO)

BACKGROUND OF THE INVENTION

1. Field of the Invention

The present invention relates to a display system for a work vehicle having at least one kind of Power Take Off (PTO) mode.

2. Description of the Related Art

A display system for a tractor having a PTO shaft is disclosed in US 2010/0191404A1. This tractor includes a rotation speed sensor for detecting a rotation speed of an engine and a tachometer for displaying an engine rotation speed detected by this rotation speed sensor. The tractor further includes a rotation speed sensor for detecting a rotation speed of the PTO shaft. The document however fails to disclose a function of displaying a detected PTO shaft rotation speed.

A tractor having the function of displaying an engine rotation speed and a PTO rotation speed is also known. For instance, the Japanese Unexamined Patent Application Publication No. 6-153610 (see paragraphs [0013], [0015], FIG. 1, FIG. 3) discloses a tractor having a rotation speed sensor for detecting a rotation speed of an engine. An engine rotation speed detected by this rotation speed sensor is displayed on a tachometer and a PTO rotation speed obtained by calculation of the detection result of the engine rotation speed is displayed on a PTO rotation speed indicating meter. Further, when a PTO clutch is disengaged, no input is made to the PTO rotation speed indicating meter. Moreover, the JP No. 6-153610 discloses, in its FIG. 3, a meter displaying both an engine rotation speed and a PTO rotation speed by pointers. From this meter, both an engine rotation speed and a PTO rotation speed can be read out. However, since a displaying scale for the engine rotation speed and a displaying scale for the PTO rotation speed are arranged on concentric arcs, the display area of the inner side scale (PTO rotation speed scale) is small, which makes accurate reading of the rotation speed difficult.

In view of the state of the art described above, there is a need for a display system that allows easy reading of both an engine rotation speed and a PTO rotation speed.

SUMMARY OF THE INVENTION

A display system for a work vehicle having at least one kind of Power Take Off (PTO) mode, according to the present invention, comprises:

a rotation speed display section for selectively displaying an engine rotation speed or a PTO rotation speed in a same display area;

a display selection switch for outputting a display selection command;

a discrimination display section for displaying a discrimination object for discriminating which of the engine rotation speed and the PTO rotation speed is being displayed; and a display control section for selectively providing an engine rotation speed display signal or a PTO rotation speed display signal to the rotation speed display section based on the display selection command and providing the discrimination display section with a display signal for the discrimination object based on the display selection command.

With the above-described arrangement, as either one of an engine rotation speed and a PTO rotation speed is selected by the display selection switch, the selected rotation speed is displayed in the same display area as the display area where a rotation speed which was displayed prior to the selection.

Therefore, the entire display area is used for displaying only one rotation speed, so that there is realized a display of an easily visible large rotation speed display. Moreover, simultaneously with the displaying of the rotation speed, there is also displayed a discrimination object for discriminating which of the engine rotation speed and the PTO rotation speed is being displayed. As a result, it is readily possible to recognize which of the rotation speeds is being currently displayed.

Incidentally, the term "Power Take OFF (PTO) mode" is used herein for the purpose of discriminating the possible various modes of Power Take OFF. For instance, a rear PTO for taking off power from the rear side of a work vehicle such as a tractor is also one mode (PTO mode). Further, even for a same rear PTO, if a multiple-speeds speed changer is incorporated in its power transmission line, power take off through each speed of the speed changer is considered as one mode (PTO mode).

According to one preferred embodiment of the present invention, the system further comprises a PTO rotation speed calculation section for calculating a PTO rotation speed based on a detection signal from an engine rotation speed sensor for detecting an engine rotation speed; and the rotation speed display section displays either a calculation result of an engine rotation speed based on the detection signal from the engine rotation speed sensor or a calculation result of a PTO rotation speed based on a detection signal from the PTO rotation speed calculation section.

The above arrangement eliminates need for separately providing a sensor or the like dedicated for PTO rotation speed detection. That is, the display control section generates an engine rotation speed display signal based on engine rotation speed data calculated based on the detection signal from the engine rotation speed sensor for detecting an engine rotation speed and generates also the PTO rotation speed signal based on PTO rotation speed data calculated by the PTO rotation speed calculation section.

A work vehicle such as a tractor often includes a rear PTO shaft and a mid PTO shaft. In such case, based on a detection signal based on switchover (selection) between the rear PTO shaft and the mid PTO shaft, the PTO rotation speed calculation section calculates a PTO rotation speed of the switched (selected) PTO shaft. And, in case the rotation speed of the rear PTO shaft is displayed, a discrimination object indicating the rear PTO shaft will be displayed. Whereas, in case the rotation speed of the mid PTO shaft is displayed, a discrimination object indicating the mid PTO shaft will be displayed.

If there is provided a clutch or the like for blocking power transmission to the PTO shaft and the power transmission to this PTO shaft is currently being blocked, irrespectively of the engine rotation speed, the rotation speed display section displays the rotation speed being zero. With this, when the PTO clutch is disengaged, irrespectively of the detection result of the engine rotation speed, the PTO rotation speed will be displayed as zero. Hence, with utilization of this displaying, it is possible to clearly indicate that the clutch is currently disengaged with no driving of PTO.

DETAILED DESCRIPTION OF THE PREFERRED EMBODIMENTS

Next, an embodiment of the present invention will be described with reference to the accompanying drawings.
[General Construction of Work Vehicle]

Figure 1:
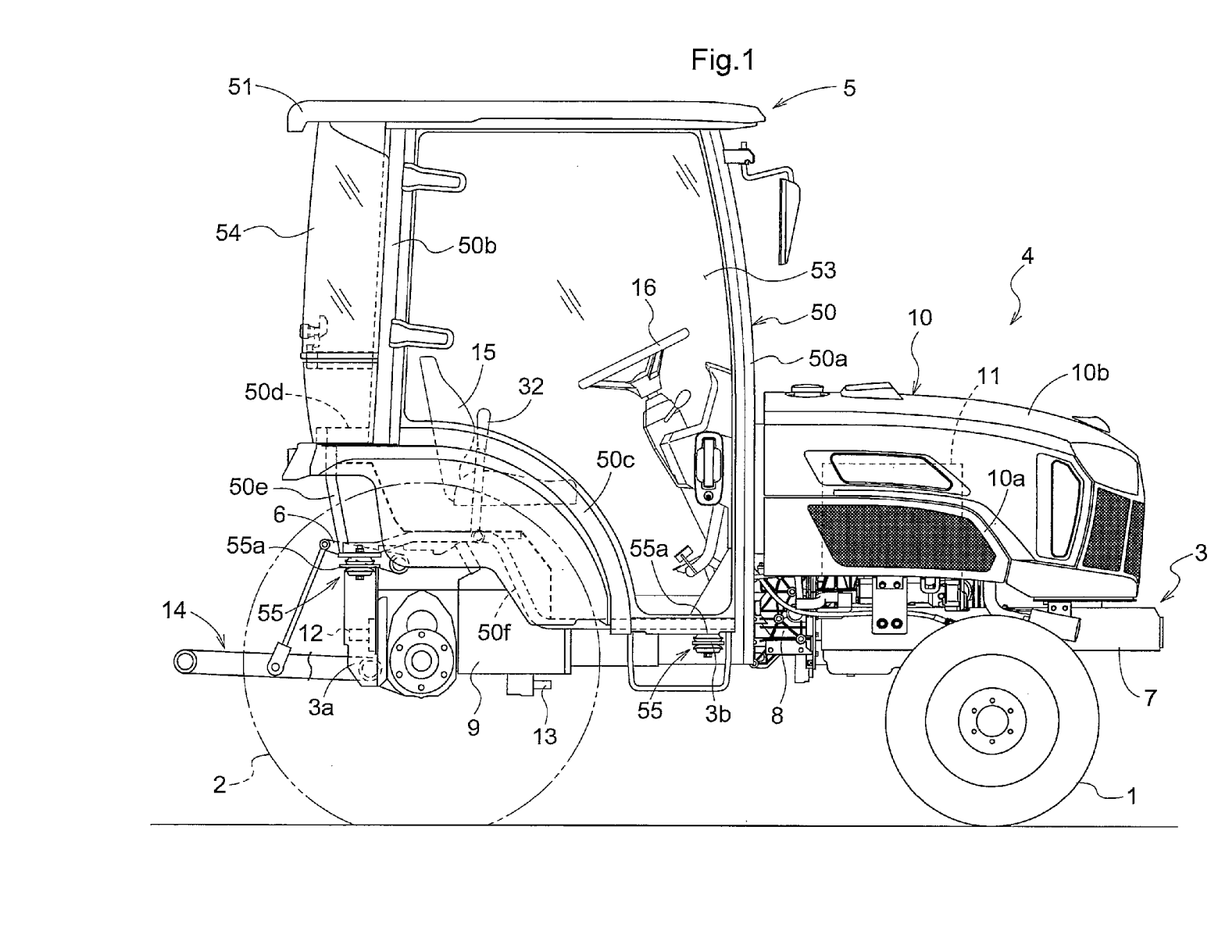
FIG. 1 is an overall side view of a tractor with a cabin.
Figure 2:
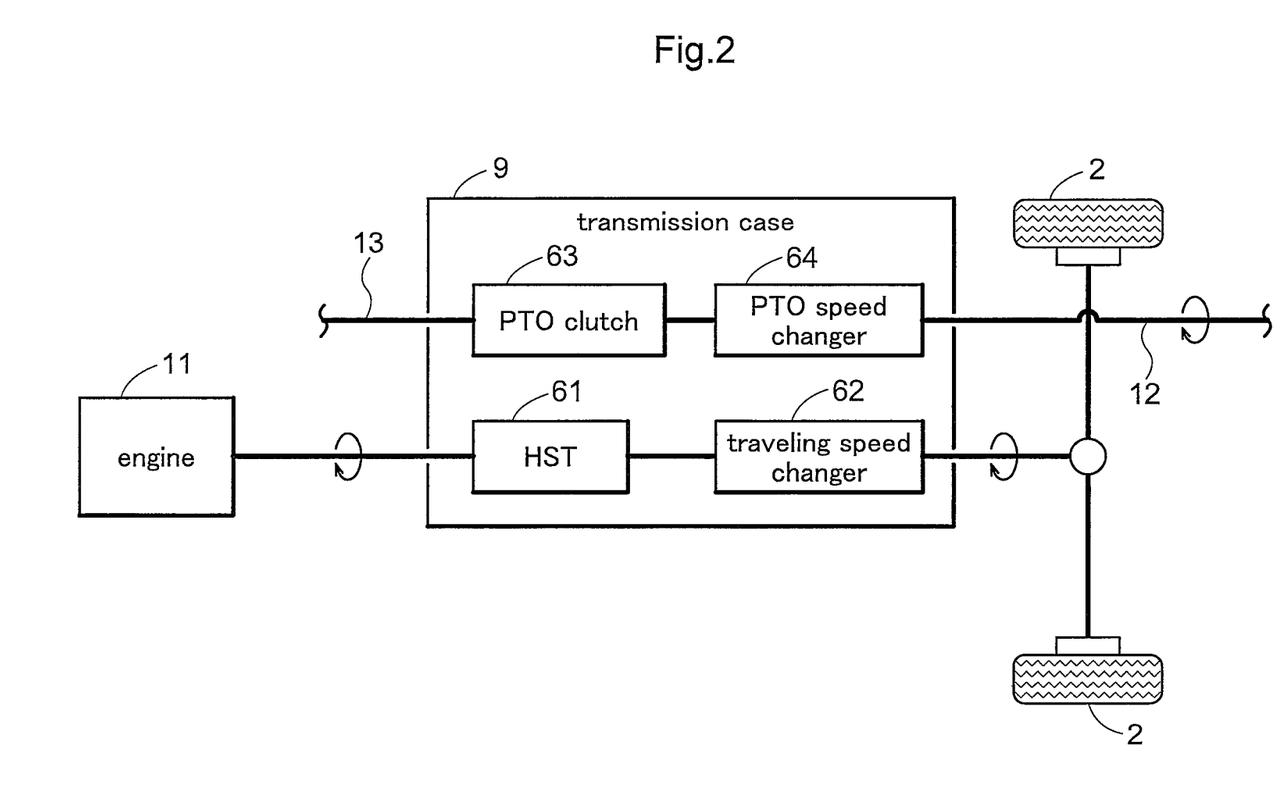
FIG. 2 is a power transmission system diagram of a tractor.

FIG. 1 is an overall side view showing a tractor as an example of a work vehicle implementing the present invention. FIG. 2 is a power transmission system diagram of this tractor. This tractor includes an engine section 4 mounted forwardly of a vehicle body frame 3 constituting a four-wheel drive type traveling vehicle body having front wheels 1 and rear wheels 2, a driver's cabin 5 mounted rearwardly thereof and lift arms 6 attached to the rear end of the tractor. And, to the lift arms 6, there is attached an unillustrated rotary cultivator or the like under a condition suspended therefrom.

The vehicle body frame 3 comprises an integrally connected assembly of a front frame 7 mounting and supporting an engine 11 disposed inside an engine hood 10 provided at a front portion of the vehicle body, a transmission case 9 mounted at a rear portion of the vehicle body, and a clutch housing 8 interposed between the front frame 7 and the transmission case 9.

To the lower portion of the front frame 7, there are supported front axle cases (not shown) mounting the left and right front wheels 1 with allowing steering thereof, the front axle cases being capable of rolling motions relative to the front frame 7. The rear wheels 2 are pivotally supported to rear axle cases (not shown) extending from the left and right opposed sides of the transmission case 9. On this vehicle body frame 3 and rearwardly of the engine hood 10, the driver's cabin 5 is mounted elastically via a vibration-isolating support mechanism 55 to be described later.

The transmission case 9 mounts the pair of left and right lift arms 6 that are vertically driven and pivoted in response to an operation of a hydraulic cylinder (not shown) incorporated at its rear upper side, and a rear PTO shaft 12 and a mid PTO shaft 13, etc. for taking off a portion of the power of the engine 11, and so on.

To the left and right lift arms 6, there is operably connected a link mechanism 14 conned to the rear portion of the transmission case 9 to be pivoted up/down relative thereto, and the power of the rear PTO shaft 12 is transmitted to a utility implement (not shown) such as a rotary cultivator, operably connected to this link mechanism 14.

The engine section 4, as indicated by broken lines in FIG. 1, includes, inside the engine hood 10, the engine 11 using a water-cooled diesel engine, mounted on the front frame 7 forwardly of the clutch housing 8. Power of this engine 11 is speed-changed through a stepless speed changer 61 (see FIG. 2) and an auxiliary speed changer 62 (see FIG. 2) comprised of a well-known gear speed changing mechanism that are disposed in the transmission case 9, and then transmitted to the front wheels 1 and the rear wheels 2 included in the traveling drive system.

And, the power transmitted from the engine 11 is transmitted in distribution also to the rear PTO shaft 12 mounted at the rear portion of the transmission case 9 and the mid PTO shaft 13 provided from the lower portion of the transmission case 9 to the forward side thereof.

The PTO drive system includes, on the upstream side of the power transmission line for the rear PTO shaft 12 and the mid PTO shaft 13, a PTO clutch 63 for effecting switching and ON/OFF of power transmission to these rear PTO shaft 12 and mid PTO shaft 13. For operating this PTO clutch 63, an operation tool is provided inside the driver's cabin 5.

The engine hood 10 includes a pair of fixed hood portions 10a, 10a disposed on the left and right lateral sides of the engine section 4 and one opening/closing hood portion 10b formed of a ceiling plate portion located upwardly of the engine section 4 and a front grill portion located forwardly of the engine section 4 integrated with each other. And, the opening/closing hood portion 10b is vertically pivoted with its rear end acting as the pivot, so that the front side thereof is pivoted upwards to expose the inside of the engine section 4.
[Driver's Cabin]

Figure 3:
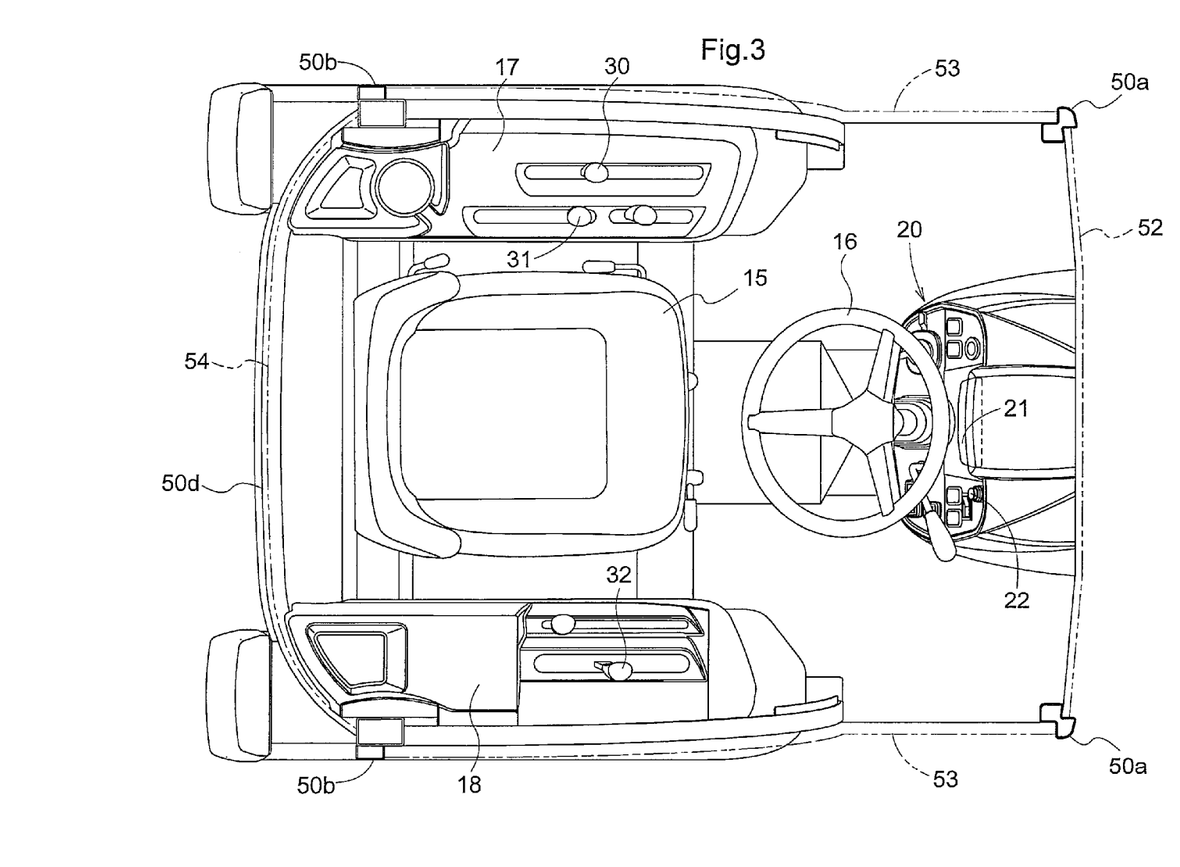
FIG. 3 is a plane view showing inside of a driver's cabin.

As shown in FIG. 1 and FIG. 3, the driver's cabin 5 consists of front pillars 50a mounted erect at the front left and right opposed sides, rear pillars 50b mounted erect at the rear left and right opposed sides, and a ceiling member 51 attached to the upper ends of these pillars. The lower ends of the front pillars 50a and the lower ends of the rear pillars 50b are connected to each other via a lower frame 50c. This lower frame 50c includes a horizontal frame portion whose front end is connected to the lower ends of the front pillars 50a and a frame portion having an arcuate shape as seen sideways and having its front end extending continuously from the rear end of the horizontal frame portion and its rear end connected to the lower ends of the rear pillars 50b.

Further, the lower ends of the left and right front pillars 50a are connected to each other via a front transverse frame (not shown), and as shown in FIG. 3, the lower ends of the rear pillars 50b are connected to each other via a rear transverse frame 50d having a curved shape with its right/left center portion bulging toward the rear side as seen in the plane view.

In this way, the front pillars 50a and the rear pillars 50b supporting the ceiling member 51, the lower frame 50c interconnecting these front and rear pillars 50a, 50b, the front transverse frame interconnecting the lower ends of the front pillars 50a, and the rear transverse frame 50d interconnecting the lower ends of the left and right rear pillars 50b together form a framework 50 having a box-like outer contour as a whole.

To the front side of this framework 50, there is attached a front shield glass 52 formed of e.g. a transparent curved glass sheet and on the left and right sides, there are provided a pair of left and right outwardly opening type door panels 53 comprised of transparent glass sheets. Further, to the rear side of the framework 50 too, there is attached a rear shield glass 54 formed of e.g. a transparent curved glass sheet.

Of the rear transverse frame 50d interconnecting the lower ends of the left and right rear pillars 50b, at portions thereof downwardly and slightly inwards in the vehicle body left-right direction of the lower ends of the left and right rear pillars 50b, there are provided a pair of support members 50e for supporting this rear transverse frame 50d on its left and right opposed sides from under. Further, between the lower ends of the support members 50e and the front transverse frame (not shown) slightly inwards in the vehicle body left-right direction of the lower ends of the left and right front pillars 50a, there are provided front-rear frames 50f each having a stepped shape with its rear side being formed high and its front side being formed low.

At the front ends and rear ends of the left and right front-rear frames 50f, there are respectively provided vibration isolating support mechanisms 55 for elastically supporting the entire driver's cabin 5 with using vibration isolating members 55a.

In the rear vibration isolating support mechanism 55, at the rear end of the transmission case 9, there are provided support deck portions 3a that extend obliquely upwards toward the left and right opposed outer sides. And, the mechanism 55 includes the vibration isolating members 55a interposed between the upper ends of the support deck portions 3a and the rear ends of the front-rear frames 50f.

The front vibration isolating support mechanism 55 includes the vibration isolating members 55a interposed between support bodies 3b provided at front-rear intermediate portions of the vehicle body frame 3 and the front ends of the front-rear frames 50f.

Inside the driver's cabin 5, a driver's seat 15 is mounted at the center on the rear side thereof, and forwardly of this driver's seat 15, there are mounted a steering wheel 16 and an instrument panel 20. And, on the left side of the driver's seat 15, there is mounted a traveling line control panel 17 including a main speed changer lever 30 and an auxiliary speed changer lever 31, and on the right side thereof, there is mounted an implement line control panel 18 including a hydraulic lever 32 for lifting up/down the lift arms 6, etc.

[Lever Pivoting Portion]

Figure 4:
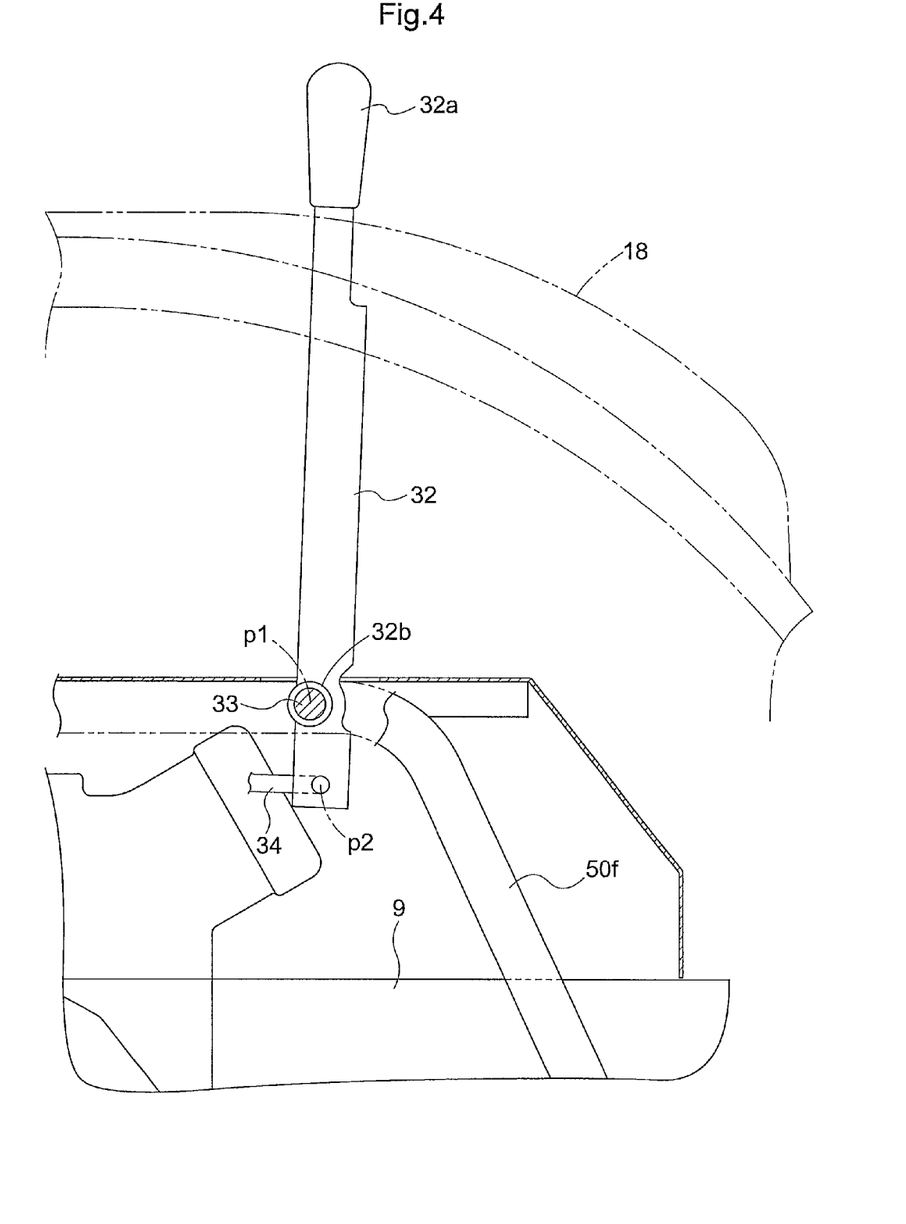
FIG. 4 is a section view showing an attaching portion of a hydraulic lever.

As shown in FIG. 4, for the hydraulic lever 32 provided in the implement control panel 18 inside the driver's cabin 5 with its gripping control portion 32a projecting therefrom, a pivot shaft 33 acting as a pivot (p1) therefor is fixedly welded to upper portion of the front-rear frame 50f provided on the bottom of the driver's cabin 5 and includes a boss portion 32b outwardly engaged with this pivot shaft 33, so that the hydraulic lever 32 is pivotable in the front-rear direction.

And, to the operational portion at the lower end of the hydraulic lever 32, there is operably connected a link member 34 which is pivotable about a transverse axis (p2) extending in parallel with the pivot (p1), so that the lever operates a control valve (not shown) for lifting up/down the lift arms 6.

With the above, the pivot shaft 33 of the hydraulic lever 32 is fixedly welded to the front-rear frame 50f, but as this front-rear fame 50f is a constituent member of the driver's cabin 5 and is elastically supported to the vehicle body frame 3, the pivot shaft 33 too is elastically connected together with the driver's cabin 5.

On the other hand, the control valve (not shown) for lifting up/down the lift arms 6 is supported to the vehicle body frame 3, so vibration of the engine 11 tends to be intensely applied thereto. However, as this control valve is connected to the hydraulic lever 32 via the relatively pivotable link member 34 and the hydraulic lever 32 is provided in the elastically supported driver's cabin 5, such intense transmission of vibration from the engine 11 side is restricted.

Further, though not shown, the main speed changer lever 30 and the auxiliary speed changer lever 31 mounted on the traveling line control panel 17 also have their pivot shafts (not shown) fixedly welded to the left front-rear frame 50f of the driver's cabin 5. Further, the operational portions thereof are coupled via an unillustrated link mechanism, etc. to a speed changer (not shown) mounted inside the transmission case, so that like the hydraulic lever 32, intense transmission of vibration from the engine 11 side is restricted.

[Instrument Panel]

Figure 5:
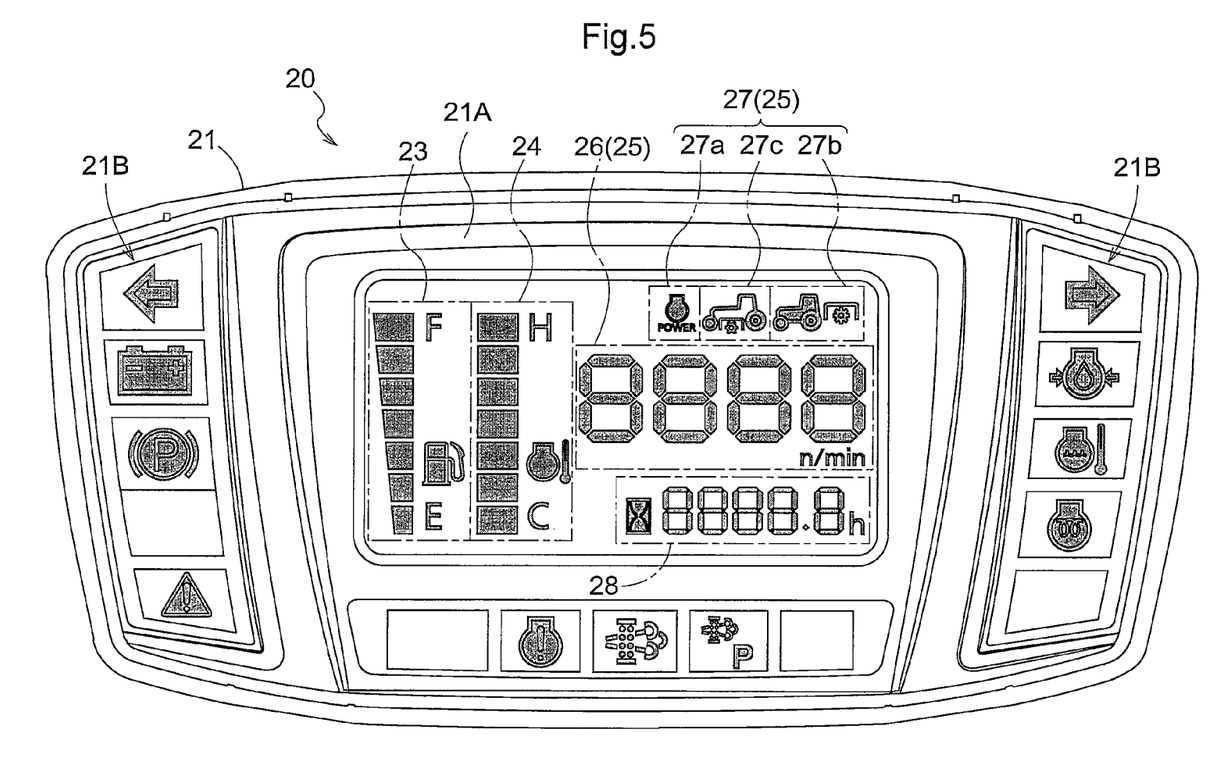
FIG. 5 is an explanatory view of a control panel section.

As shown in FIG. 3 and FIG. 5, the instrument panel 20 mounted inside the driver's cabin 5 includes a display apparatus 21 at the center portion thereof. And, on the right side of this display apparatus 21, a display selection switch 22 is provided. This display selection switch 22 is provided for allowing selection of contents to be displayed in a rotation speed display section 26 to be described later.

The display area of the display apparatus 21 consists of a main display area 21A occupying most of the center portion and sub display areas 21B provided in small areas on the left and right sides of the main display area 21A. The display contents of these sub display areas 21B are auxiliary contents such as conditions of a direction indicator, a brake lamp, etc. which are not directly related to the display contents of the main display area 1A. So, explanation thereof will be omitted herein.

Within the display area of the main display area 21A of the display apparatus 21, there are arranged a fuel remaining amount display section 23, a water temperature display section 24, the rotation speed display section 26 and a discrimination display section 27. The rotation speed display section 26 and the discrimination display section 27 can be combined into a group as a rotation speed display unit 25. The rotation speed display section 26 displays a rotation speed of a selected kind. And, the discrimination display section 27 is provided for allowing visual discrimination of the display contents being currently displayed in the rotation speed display section 26 with using a discrimination object associated therewith. In this embodiment, the discrimination object comprises icons.

Downwardly of the rotation speed display section 26, there is also provided an hour meter 28 for displaying integrated (added up) operation hours. The fuel remaining amount display section 23 and the water temperature display section 24 employ a bar-graph type display mode, with the upper side showing larger fuel remaining amounts or higher water temperatures.

The rotation speed display section 26 is configured to display a four-digit number of 0 to 9 with using seven large segments and to constantly display a character string "n/min" at the end of the numerals as a rotation speed notation under the number.

The discrimination display section 27 is located on the upper side of the rotation speed display section 26. This discrimination display section 27 is comprised of a first discrimination object 27a indicating displaying of an engine rotation speed in the rotation speed display section 26, a second discrimination display section 27b indicating displaying of a rotation speed of the rear PTO shaft 12 in the same, and a third discrimination display section 27c indicating displaying of a rotation speed of the mid PTO shaft 13 in the same.

And, the discrimination objects 27a, 27b, 27c are an icon that allows easy imaging (image conjuring-up) of the engine 11, an icon that allows easy imaging of a, center lower portion of the vehicle body and an icon that allows easy imaging of a rear side of the vehicle body, respectively. With these, it is readily possible to instinctively recognize what the selected rotation speed is. The rotation speed display section 26 employs a segment display device, whereas the discrimination display section 27 employs a lamp display device. Needless to say, the rotation speed display section 26 and the discrimination display section 27 can comprise a same flat panel display. Further, the rotation speed display section 26 alone can be comprised of a flat panel display. Moreover, the main display area 21A as a whole of the display apparatus 21 can be comprised of a flat display panel.

On the lower side of the rotation speed display section 26, there is provided an hour meter 28 which displays a five digit number inclusive of a decimal point with using segments sufficiently smaller (about 1/4 in the area ratio) than the segments displayed in the rotation speed display section 26, and a character "h" representing in short for the unit of hour, is displayed at the end of the number.

[Controller]

Figure 6:
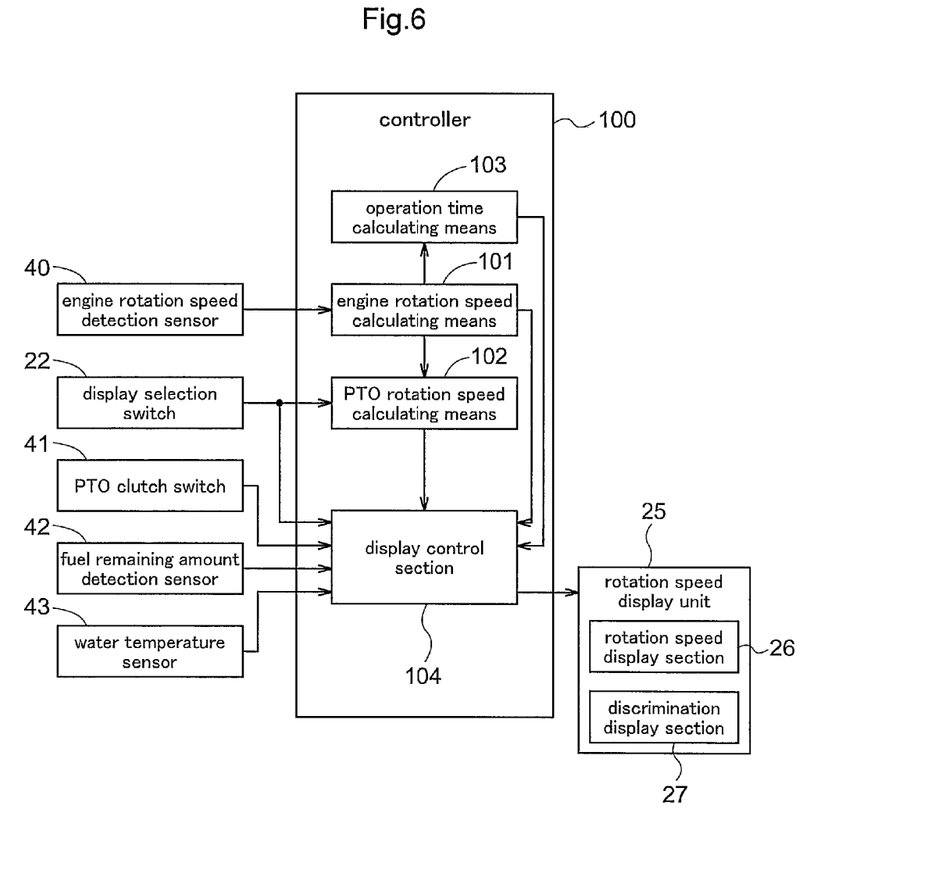
FIG. 6 is a block diagram showing a control system for a rotation speed display apparatus.

Displaying operations in the rotation speed display section 26 and the discrimination display section 27 together constituting the rotation speed display unit 25 are effected, based on commands issued from a controller 100 comprised of a microcomputer.

As shown in FIG. 6, the controller 100 inputs a detection signal from an engine rotation speed sensor 40 for detecting a rotation speed of the engine 11.

Further, this controller 100 inputs, from the display selection switch 22, a command signal for selecting which one of the engine rotation speed, a PTO rotation speed of the rear PTO shaft 12 or of the mid PTO shaft 13, is to be displayed by the rotation speed display unit 25.

Also, the controller 100 inputs a detection signal from a PTO clutch switch 41 which detects an engaging or disengaging operation of a PTO clutch 63 for establishing or blocking transmission of drive power to the rear PTO shaft 12 and the mid PTO shaft 13, on the transmission-wise upstream of these rear PTO shaft 12 and mid PTO shaft 13.

Moreover, this controller 100 inputs also a detection signal of fuel remaining amount from a fuel remaining amount detection sensor 42 for detecting a fuel remaining amount of the fuel tank (not shown) and a detection signal of a water temperature sensor 43 for detecting a water temperature of engine cooling water.

The controller 100 incorporates an engine rotation calculation section 101 for calculating an engine rotation speed, a PTO rotation speed calculation section 102 for calculating a PTO rotation speed, an operation time calculation section 103 and a display control section 104 for outputting a display signal to be displayed by the rotation speed display unit 25, with these components being incorporated as functional sections substantially realized by a program.

The engine rotation speed calculation section 101 calculates a rotation speed for each small time unit (e.g. 10 mm/sec approximately), based on the frequency of input pulses inputted from the engine rotation speed detection sensor 40 and obtains a moving average of the calculation result for a predetermined times and outputs the calculation result to the display control section 104 so that this average value may be displayed as an engine rotation speed in the rotation speed display section 26.

The calculation result of the engine rotation speed calculation section 101 is inputted to the PTO rotation speed calculation section 102 and the operation time calculation section 103.

The PTO rotation speed calculation section 102 effects calculation of a rotation speed of the rear PTO shaft 12 or mid PTO shaft 13 whichever selected, based on the calculation result of the engine rotation speed by the engine rotation speed calculation section 101 and a selection signal from the display selection switch 22 and outputs the result of this calculation to the display control section 104.

The operation time calculation section 103 outputs to the display control section 104 a result obtained by counting a continuation period of a certain engine rotation speed (e.g. 100 n/min approximately) that can be reasonably determined as a driving condition of the engine 11, based on the calculation result of engine rotation speed by the engine rotation speed calculation section 101.

The display control section 104 outputs a signal to be displayed by the rotation speed display unit 25, based on a command signal from the display selection switch 22 or the PTO clutch switch 41. More particularly, if the command signal from the display selection switch 22 is a command for displaying the rotation speed of the engine (this will be referred to as "Selection Command 1" hereinafter for the sake of convenience), the display control section 104 generates an engine rotation speed display signal generated based on the calculation result of the engine rotation speed calculation section 101. With this, the engine rotation speed is displayed in the rotation speed display section 26. Simultaneously, the display control section 104 transmits a display signal for the corresponding discrimination object to the discrimination display section 27. In this case, in response to this display signal, the icon of the first discrimination object 27a is turned ON (illuminated), whereas the other respective icons of the second discrimination object 27b and the third discrimination object 27c are turned OFF (dis-illuminated).

If the command signal from the display selection switch 22 is a command for displaying the rotation speed of the rear PTO shaft 12 (this will be referred to as "Selection Command 2" hereinafter for the sake of convenience), the display control section 104 generates a PTO rotation speed display signal indicating the rotation speed of the rear PTO shaft 12 based on the calculation result of the PTO rotation speed calculation section 102 and transmits this to the rotation speed display section 26. With this, the rotation speed of the rear PTO shaft 12 is displayed in the rotation speed display section 26. Simultaneously, the display control section 104 transmits to the discrimination display section 27 a discrimination object display signal for illuminating the ion of the second discrimination object 27b. With this, in the discrimination display section 27, the icon of the second discrimination object 27b is turned ON, while the other respective icons of the first discrimination object 27a and the third discrimination object 27c are turned OFF.

If the command signal from the display selection switch 22 is a command for displaying the rotation speed of the mid PTO shaft 13 (this will be referred to as "Selection Command 3" hereinafter for the sake of convenience), the display control section 104 generates a PTO rotation speed display signal indicating the rotation speed of the mid PTO shaft 13 based on the calculation result of the PTO rotation speed calculation section 102 and transmits this to the rotation speed display section 26. With this, the rotation speed of the mid PTO shaft 13 is displayed in the rotation speed display section 26. Simultaneously, the display control section 104 transmits to the discrimination display section 27a discrimination object display signal for illuminating the ion of the third discrimination object 27c. With this, in the discrimination display section 27, the icon of the third discrimination object 27c is turned ON, while the other respective icons of the first discrimination object 27a and the second discrimination object 27b are turned OFF.

In other cases than the above, if this display control section 104 inputs a detection signal of a PTO clutch disengagement from the PTO clutch switch 41 and if the command signal from the display selection switch 22 is the Selection Command 2 or Selection Command 3, the display control section 104 outputs a PTO rotation speed display signal so that the rotation speed display section 26 displays "000" indicating the rotation speed being zero, with priority over the calculation result of the PTO rotation speed calculation section 102.

In addition to the engine rotation speed and PTO rotation speeds described above, the display control section 104 outputs also a display signal of operation time to the hour meter 28 of the rotation speed display unit 25 based on an input signal from the operation time calculation section 103 and outputs a display signal of a fuel remaining amount to the fuel remaining amount display section 23 and outputs a display signal of a water temperature to the water temperature display section 24.

[Rotation Speed Display Control]

Next, there will be described an example of the flow of control for rotation speed display with using a rotation speed display control routine as shown in FIG. 6.

Figure 7:
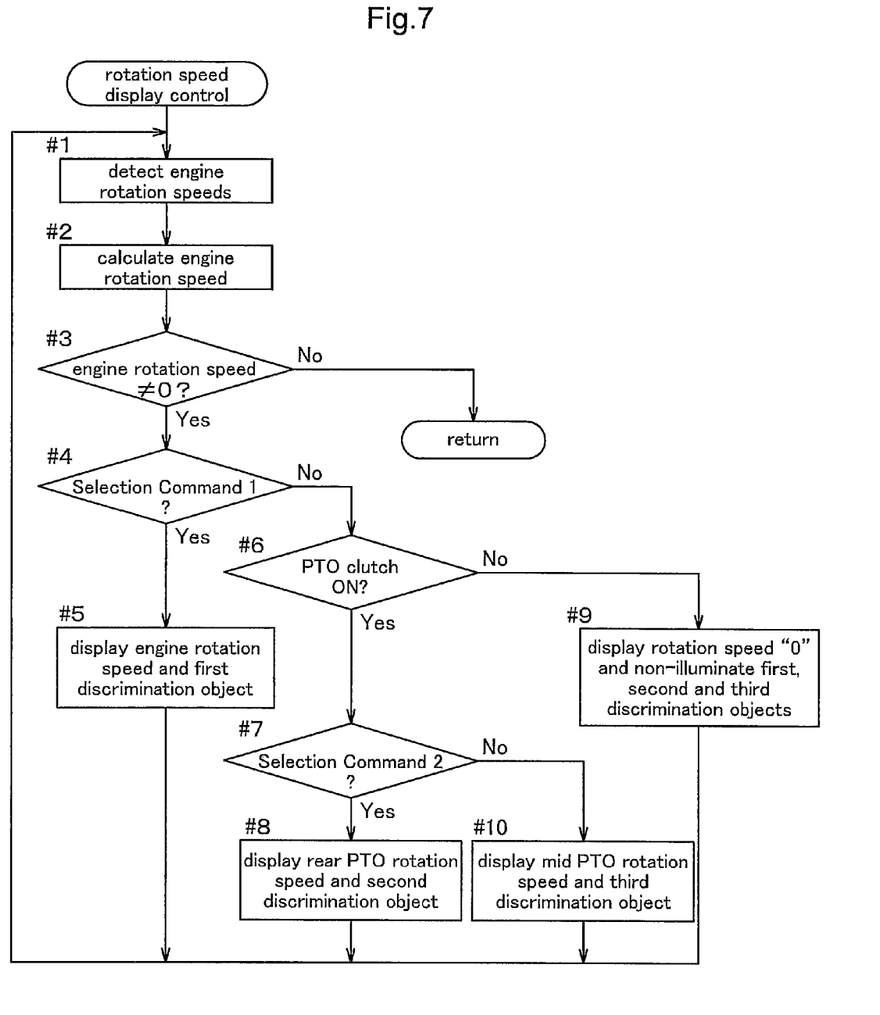
FIG. 7 is a flowchart illustrating a rotation speed display control.

When the engine 11 is started, a control program by the controller 100 is activated and the following operations are effected.

[1] detection of engine rotation speeds inputted from the engine rotation speed sensor 40 (step #1).

[2] calculation of an engine rotation speed based on engine rotation speeds inputted from the engine rotation speed detection sensor 40 (step #2).

[3] detection of whether the engine rotation speed is "0" or not. If the speed is 0(rotation speed of 100 n/mm or lower), the program exits the rotation speed display routine to return to the upper level routine. If the speed is not 0, the program determines whether the command by the display selection switch 22 is Selection Command 1 or not (steps #3, #4).

[4] If Selection Command 1, display signal is outputted to the rotation speed display unit 25 (the rotation speed display section 26 and the discrimination display section 27) so as to display the engine rotation speed and to illuminate the icon of the first discrimination object 27a (steps #4, #5).

[5] If not Selection Command 1, the program determines whether the PTO clutch is engaged or not. If the clutch is engaged, the program determines whether the command by the selection switch 22 is Selection Command 2 or not (steps #6, #7).

[6] If Selection Command 2, display signal is outputted to the rotation speed display unit 25 so as to display the rear PTO rotation speed and to illuminate the icon of the second discrimination object 27b (steps #7, #8).

[7] If not Selection Command 2, display signal is outputted to the rotation speed display unit 25 so as to display the mid PTO rotation speed and to illuminate the icon of the third discrimination object 27c (steps #7, #9).

[8] If the PTO clutch is not engaged, a signal is outputted for causing the rotation speed display section 26 to display the rotation speed being "0" and display signal is outputted to the discrimination display section 27 so as to turn OFF (not display) the icons of the first, second and third discrimination objects 27a, 27b, 27c (steps #6, #10).

[9] repeat the respective steps described in [1]-[8] above.

[Further Embodiment 1]

In the foregoing embodiment, there was disclosed the arrangement wherein with provision of both the rear PTO shaft 12 and the mid PTO shaft 13, in response to an operation of the display selection switch 22, an engine rotation speed, a rotation speed of the rear PTO shaft 12 and a rotation speed of the mid PTO shaft 13 can be selectively displayed. The invention is not limited thereto. For instance, with provision of only the rear PTO shaft 12 or provision of only the mid PTO shaft 13, the rotation speed of the rear PTO shaft 12 or the mid PTO shaft 13 can be selectively displayed.

In the above case, there will be provided the first discrimination object 27a having the icon indicating displaying of a rotation speed of the engine 1 and the second discrimination object 27b or the third discrimination object 27c having the icon indicating displaying of a rotation speed of the rear PTO shaft 12 or the mid PTO shaft 13 whichever is actually provided.

The rest of the arrangement may remain the same as that of the foregoing embodiment.

[Further Embodiment 2]

In the foregoing embodiment, in displaying of a PTO rotation speed, no consideration is given to the speeds used in the PTO speed changer 64. However, if a different PTO mode is assigned to each used speed of the PTO speed changer 64, for the used speed of the PTO speed changer 64, there may be a discrimination object dedicated thereto in the discrimination display section 27. For instance, if the PTO speed changer 64 has a high speed and a low speed as its speeds, in case the high speed is selected, a discrimination object (icon) indicating the high speed will be displayed in the discrimination display section 27, and its PTO rotation speed will be displayed in the rotation speed display section 26. If the low speed is selected, a discrimination object (icon) indicating the low speed will be displayed in the discrimination display section 27, and its PTO rotation speed will be displayed in the rotation speed display section 26.

Further Embodiment 3

In the foregoing embodiment, as the rotation speed display section 26, there was described one configured to display four-digit number from 0 to 9 using seven large segments. However, the mode of displaying is not limited thereto. For instance, the number can be a continuous series of digits. In this way, any desired displaying mode can be employed.

The rest of the arrangement may remain the same as that of the foregoing embodiment.

[Further Embodiment 4]

In the foregoing embodiment, the icons used in the discrimination display section 27 are illustrations that can conjure up the image of the engine 11 or the tractor. The invention is not limited thereto. Instead, they may be presented in the form of characters or marks, or the like.

What is claimed is:

1. A display system for a work vehicle having at least one kind of Power Take Off (PTO) mode, comprising:

a rotation speed display section for selectively displaying an engine rotation speed or at least one kind of PTO rotation speed in a same display area;

a display selection switch for outputting an engine display selection command selecting the engine rotation speed to be displayed, and also outputting a PTO display selection command selecting the PTO rotation speed to be displayed;

a discrimination display section for displaying a group of discriminating objects each having an icon, the icon having a turn-ON state and a turn-OFF state; and a display control section for controlling contents displayed by the rotation speed display section, and also controlling the turn-ON state and the turn-OFF state of the icon of the discrimination display section;

wherein the group of discriminating objects includes an engine discrimination object for identifying the engine rotation speed and at least one kind of PTO discrimination object for identifying the PTO rotation speed;

wherein in response to the engine display selection command, the display control section provides the rotation speed display section with an engine rotation speed display signal generated based on a detection signal from an engine rotational speed sensor that detects the engine rotational speed, and the icon of the engine discrimination object to be turned ON and the icon of each of any other discrimination objects than the engine discrimination object to be turned OFF; and wherein in response to the PTO display selection command, the display control section provides the rotation speed display section with a PTO rotation speed display signal generated based on a detection signal from the engine rotational speed sensor, and causes the discrimination display section to turn the icon of the PTO discrimination object associated with the PTO display selection command ON and turn the icon of each of any other discrimination objects other than the turned-ON discrimination object OFF;

wherein when the PTO display selection command is outputted and power transmission to the PTO shaft is blocked, the display control section provides the rotation speed display section with a display signal indicative of a zero rotational speed instead of the PTO rotation speed display signal; and wherein when the engine display selection command is outputted and the power transmission to the PTO shaft is blocked, the display control section provides the rotation speed display section with the engine rotation speed display signal.

2. A display system according to claim 1, wherein there are provided a plurality of kinds of PTO mode, the rotation speed display section being capable of displaying a PTO rotation speed in each PTO mode, the discrimination object being assigned to each PTO mode.

3. A display system according to claim 2, wherein there are provided a plurality of PTO shafts; and each PTO mode corresponds to power take-off from each PTO shaft.

4. A display system according to claim 2, wherein there is provided a PTO shaft for transmitting rotational power from a PTO speed changer having a plurality of speeds; and each PTO mode corresponds to a speed selected in the PTO speed changer.

5. A display system according to claim 1, wherein the rotation speed display section is a flat panel display, and the discrimination display section is a lamp display.

6. A display system according to claim 1, wherein the rotation speed display section and the discrimination display section are assigned to adjacent areas in a same flat panel display.

7. A display system according to claim 1, wherein the rotation speed display section is a number display section and the discrimination display section is an icon display section.

8. A display system according to claim 1, wherein as the PTO rotation speed, there is used a rotation speed of a rear PTO shaft and a mid PTO shaft that are selectively driven; and the PTO rotation speed calculation section calculates PTO rotation speed data of whichever driven PTO shaft.

9. A display system according to claim 1, wherein the rotation speed display section is configured to display the engine rotation speed and the PTO rotation speed with seven segments.

10. A display system according to claim 1, wherein the rotation speed display section and the discrimination display section are arranged adjacent each other.

* * * * *

UNITED STATES PATENT AND TRADEMARK OFFICE
CERTIFICATE OF CORRECTION

PATENT NO. : 9,302,582 B2  
APPLICATION NO. : 13/775606  
DATED : April 5, 2016  
INVENTOR(S) : Togo et al.

Page 1 of 1

It is certified that error appears in the above-identified patent and that said Letters Patent is hereby corrected as shown below:

In the claims

Column 10, Line 52, Claim 1, after "and" insert -- causes --

Signed and Sealed this
Twenty-eighth Day of June, 2016

Michelle K. Lee
*Director of the United States Patent and Trademark Office*